United States Patent [19]

Liu

[11] 4,365,044

[45] Dec. 21, 1982

[54] POLYPROPYLENE COMPOSITION FOR EXTRUSION COATING

[75] Inventor: Chia-Seng Liu, Newark, Del.

[73] Assignee: Hercules Incorporated, Wilmington, Del.

[21] Appl. No.: 288,568

[22] Filed: Jul. 30, 1981

Related U.S. Application Data

[63] Continuation-in-part of Ser. No. 264,160, May 12, 1981, abandoned.

[51] Int. Cl.$^3$ ................... C08L 23/06; C08L 23/12; C08L 25/16
[52] U.S. Cl. ................................ 525/240; 525/192
[58] Field of Search ........................ 525/240, 192

[56] References Cited

U.S. PATENT DOCUMENTS

| | | | |
|---|---|---|---|
| 3,361,849 | 1/1968 | Cramer et al. | 260/897 |
| 3,418,396 | 12/1968 | Edwards et al. | 260/897 |
| 3,547,682 | 12/1970 | Erb | 117/75 |
| 3,652,725 | 3/1972 | Diaz et al. | 260/876 B |
| 3,666,836 | 5/1972 | John | 260/897 |
| 3,794,698 | 2/1974 | Diaz et al. | 260/897 R |
| 4,032,493 | 6/1977 | Pascual | 260/28.5 A |
| 4,076,670 | 2/1978 | Godfrey | 260/27 R |
| 4,087,505 | 5/1978 | Sugimoto et al. | 264/95 |

*Primary Examiner*—Carman J. Seccuro
*Attorney, Agent, or Firm*—Edwin H. Dafter, Jr.

[57] ABSTRACT

This invention relates to a composition comprising crystalline polypropylene, a hydrogenated copolymer of vinyl toluene and alpha-methyl styrene and low density polyethylene which has improved extrudability compared to polypropylene alone.

2 Claims, No Drawings

POLYPROPYLENE COMPOSITION FOR EXTRUSION COATING

The application is a continuation-in-part of the application, Ser. No. 264,160, filed May 12, 1981, now abandoned.

This invention relates to a polypropylene composition of improved extrudability.

The extrusion coating of substrates such as paper, paperboard, fabrics and metal foils with a thin layer of plastic is practiced on a large scale. The plastic most often used is low density polyethylene, a polymer which is readily extruded as a thin coating onto the surface of a moving substrate at high rates of speed. For some coating applications, crystalline polypropylene is a more desirable coating material than polyethylene but the use of polypropylene as an extrusion coating has been severely limited by the relatively poor extrudability of polypropylene as exemplified by lower coating speed, edge necking and instability of the edge position. Even low molecular weight polypropylene cannot be extruded at the speeds desired, for example, in paper coating, without severe necking, or reduction in width, between the point of extrusion (the die lip) and the point of contact with the paper. Melt resonance which causes nonuniform coating thickness is also a common problem with polypropylene. In addition, extruded coatings of polypropylene are often characterized by poor adhesion of the substrate and by the presence of pinholes.

It is known from U.S. Pat. No. 3,652,725 that the extrudability of polypropylene can be improved by blending it with a minor amount of low density polyethylene and a minor amount of a copolymer of vinyl toluene and alpha-methyl styrene. It is also known from U.S. Pat. Nos. 3,361,849 and 3,666,836 that heat-sealable films can be made from blends of polypropylene and a hydrogenated copolymer of vinyl toluene and alpha-methyl styrene but these patents do not report any improvement in extrudability due to the presence of the hydrogenated copolymer.

In accordance with this invention it has been found that a blend of polypropylene with minor amounts of both low density polyethylene and a hydrogenated copolymer of vinyl toluene and alpha-methyl styrene possesses improved extrudability as compared to a blend of polypropylene with either low density polyethylene or the hydrogenated copolymer alone, or a combination of polypropylene, low density polyethylene and an unhydrogenated copolymer of vinyl toluene and alpha-methyl styrene. In addition to being extrudable at high speed, the compositions of the invention are also characterized by the ability to produce pinhole-free coatings that have excellent adhesion to substrates such as paper.

More particularly, the invention relates to a blend comprising (a) crystalline polypropylene having a melt flow rate at 230° C. of at least 3, (b) low density polyethylene having a density of 0.915 to 0.920, a melt index of 3 to 15, and a $G_c$ value of at least $2.5 \times 10^5$, and (c) a copolymer of vinyl toluene and alpha-methyl styrene which has been hydrogenated to the point that at least 50% of its aromatic unsaturation has been reduced and which has a drop softening point from about 100° to 160° C., component (b) being present in an amount ranging from about 3 to about 15 parts per hundred of (a), component (c) being present in an amount ranging from about 2 to about 10 parts per hundred of (a) and the total of (b) and (c) being at least about 7 and no more than about 20 parts per hundred of (a).

The crystalline polypropylene used in the invention is one having a molecular weight at the lower end of the range in which polypropylene is commercially available. The term "polypropylene" as used herein is inclusive not only of propylene homopolymer but also the predominantly crystalline copolymers of propylene with other olefins, e.g., random copolymers of propylene and ethylene or butene-1 containing up to about 7% by weight ethylene or up to 15% by weight butene-1, and crystalline copolymers of propylene and ethylene or alloys of polypropylene and polyethylene containing up to about 25% by weight of ethylene prepared by alternating polymerization of propylene and ethylene.

The low density polyethylene component has a high $G_c$ value (at least $2.5 \times 10^5$ dynes/cm$^2$), has a density of between about 0.915 and 0.920, and has a melt index of between about 3 and about 15. $G_c$ is the value of the elastic or rigidity modulus $G'$ at 180° C. at the dynamic shear rate at which it is equal to the loss modulus $G''$ at that temperature at the same shear rate. Means for determining the values of $G'$ and $G''$ at varying shear rates are described in the book, "Rheometry" by K. Walters, Chapman and Hall, Ltd., London, 1975. The method employed to obtain the value of $G_c$ for the samples of polyethylene used in the examples of this invention were obtained using a Rheometrics Mechanical Spectrometer with a cone and plate geometry with 25 mm platens and a 0.1 rad cone, the top plate (the cone) being oscillated in a sinusoidol manner and the torque being measured on the bottom plate. The polyethylene is prepared by methods well known to the art, and representative materials are set forth in the following table:

| | REPRESENTATIVE PROPERTIES, POLYETHYLENE COMPONENT | | |
|---|---|---|---|
| Polymer | Melt Index dg. min. (190° C.) | Density g/cc | $G_c \times 10^5$ dynes/cm$^2$ |
| (1) | 6.5 | 0.917 | 2.7 |
| (2) | 12.0 | 0.917 | 3.4 |
| (3) | 7.0 | 0.917 | 2.7 |
| (4) | 5.5 | 0.916 | 2.7 |

The hydrogenated copolymers of vinyl toluene and alpha-methyl styrene employed in this invention are amorphous polymerized materials which are hard, brittle solids at room temperature, have a softening range at elevated temperature as shown by a ring and ball softening point from about 100° to 160° C., an average molecular weight (Rast) of about 500 and above, an iodine value less than about 2 and are compatible with the polyolefins. They are prepared by hydrogenation of copolymers which contain from about 25 to 85% vinyl toluene, by weight, with the balance alpha-methyl styrene until at least 50% of the aromatic unsaturation is removed.

A commercial copolymer comprising about 25% by weight of alpha-methyl styrene and about 75% by weight vinyl toluene having a ring and ball softening point between 75° and 120° C. is typical of materials which can be hydrogenated to make copolymers useful in this invention.

The copolymerization of vinyl toluene and alpha-methyl styrene can be carried out in known manner with or without solvent and utilizing a known catalyst such as sulfuric acid, phosphoric acid, fuller's earth, boron trifluoride, amphoteric metal chloride such as zinc chloride or aluminum chloride, and the like. The polymerization is preferably carried out under conditions which cause substantially all of the hydrocarbon monomers to react with minimum dimer formation.

The hydrogenation of the copolymer can be carried out utilizing a catalyst such as nickel on kieselguhr, copper chromite, palladium on carbon, platinum on alumina, or cobalt plus zirconia on kieselguhr. The hydrogenation is preferably carried out in the presence of a solvent such as methyl cyclohexane, toluene, p-menthane, and the like, utilizing pressures ranging from 500 to 10,000 psi and a temperature between 150° and 300° C.

While any of the aforesaid hydrogenated hydrocarbon polymers having average molecular weights of about 500 (Rast) and above, an iodine value less than about 2, a ring and ball softening point above about 100° C., and compatibility with the polyolefin are operable herein, the preferred hydrogenated hydrocarbon polymers which are particularly effective in providing the improvements in accordance with the invention are characterized by average molecular weights above about 600 (Rast method), softening points above 130° C., iodine values less than about 2, and compatibility with the polyolefin corresponding to a haze value less than about 25%, as determined on a 5-mil film which has been pressed at 232° C. and then quenched, using the test method described in ASTM D1003-61 (Reapproved 1977).

The composition can be prepared in various ways, such as dry blending, dry blending followed by passing through a compounding extruder, compounding on a milling roll, or in a Banbury mixer, by fusion, or by blending in solution. Any method whereby the components can be blended together will produce the desired blend. For example, fine pellets of each polymer, having an average size of about 1/16 inch with up to about 20% of the pellets being about ⅛ inch in diameter with some pellets being smaller than 1/16 inch, are blended mechanically, and the blend is fed to an extruder wherein it is fused and extruded.

The compositions can be extruded or fabricated at melt temperatures of up to about 335° C. although melt temperatures in the range of about 290° C. to 305° C. are preferred and have been found to give excellent results with maximum coating speeds with a minimum of defects such as pinholes.

The compositions of the invention can include additives such as antioxidants, stabilizers for inhibiting degradation by heat, ultraviolet light and weathering, opaqueing pigments such as titanium dioxide and carbon black, plasticizers, and small amounts (less than about 20%) or other compatible polymers. Similarly, for some uses, small proportions of other polyolefins or copolymers thereof such as those of ethylene and propylene may be blended with the composition of the invention.

The invention is illustrated by the following examples.

EXAMPLES 1-3

The components in these examples are as follows:
Polypropylene
  commercial polypropylene having an intrinsic viscosity of 2.0 and a melt flow of 12
Polyethylene
  commercial low-density polyethylene having a density of 0.917, a $G_c$ value of $2.7 \times 10^5$, and melt index of 6.5
Hydrogenated hydrocarbon polymer
  commercial copolymer of 75% vinyl toluene and 25% alpha-methyl styrene, by weight, which has been hydrogenated until about 97% of its aromatic unsaturation had been reduced. The hydrogenated polymer has a ring and ball softening point of about 140° C.

The unhydrogenated hydrocarbon polymer of Example D is the same commercial copolymer of vinyl toluene and alpha-methyl styrene referred to above except without hydrogenation. It has a ring and ball softening point of about 120° C.

The first step is to blend the ingredients of the formulation together with 0.1 part of phenolic antioxidant and 0.1 part of calcium stearate in a Henschel mixer for 2 minutes at high speed, and then one minute at low speed. The blended material is then fed into the first barrel of a Kokneader compounding extruder. The Kokneader is set at the following conditions:

| First Barrel Temperatures | |
| --- | --- |
| Zone 1 | 163° C. |
| Zone 2 | 163° C. |
| Screw speed | Maximum |
| L/D ratio | 8:1 |

The second barrel is set at a 90° angle to the first barrel. The mixed molten material is conveyed from the first barrel to the second one where it is prepared for pelletizing. This second barrel is set to the following conditions:

| Second Barrel Temperatures | |
| --- | --- |
| Zone 1 | 163° C. |
| Zone 2 | 232° C. |
| Die | 204° C. |
| Screen pack | 60/100/60 mesh size |

The pelletizing die has 30 holes with 0.070 inch diameter each. The molten "strings" exit the die and are cut into small beads (hot cut) that are cooled in a water bath before being collected and dried.

For the extrusion coating runs, the following procedures and conditions apply to all the formulations prepared.

The extruder is a 2½" Davis Standard with an L/D ratio of 24:1 and a compression ratio of 2.87:1. The die is a 12" Johnson flex lip coat-hanger type film die. The extrusion rate is 70±3 lb./hr. in all cases. The formulations are extruded onto a moving web of paper 24" wide just prior to the paper entering the nip between a chill roll and nip roll.

The following extrusion coating conditions are used for all formulations:

| | |
| --- | --- |
| Extruder Barrel Temperatures: | 204° C., 260° C., 288° C., 316° C., 316° C. |
| Adapter Temperature: | 316° C. |
| Die Temperature: | 316°°C. |
| Air Gap: | 2¾" |
| Paper Substrate: | 40#/ream Kraft paper |

The die opening is set to 12 mils except at the ends where the opening is reduced to give an oval die profile to reduce edge bead. When starting a new material a 10-minute purge is necessary to minimize the previous material in the new melt. Then the melt is collected for two minutes and weighed to determine the extrusion rate. Once the rate has been regulated, the converter rolls are started and the extruder and die are positioned. Coating is begun. The coating speed is started at 200 feet per minute (fpm) and increased in increments of 50 fpm until edge weave or melt resonance occurs. The maximum speed at which the apparatus used can be operated is about 600 fpm.

The coated paper on the windup is flagged at each speed. A sample is collected at each speed flagged. The coating width of each sample is measured.

Using the pressure-sensitive tape test method, result of fiber-tear is obtained from all coated samples indicating that good adhesion is achieved for the products of the examples.

The results of all seven formulations and the control runs A, B and C can be observed in Table I.

It can be concluded from the results that the invention is effective in improving polypropylene's extrusion coating processability.

EXAMPLES 4-9

The same procedure as used in Examples 1-3 is employed except that a 16" Egan keyhold die is used in place of the 12" Johnson flex lip coat-hanger type film die, the air gap is one quarter inch greater, and the take-up equipment is modified to allow a maximum coating speed rate of 900 fpm. The extrusion rate is 93 lb./hr. in all cases. Formulations, including controls E and F, and results obtainable are shown in Table II.

In all cases the adhesion of the coating to the paper was good and the coating was free from pinholes.

EXAMPLES 10-18

Using the procedures of previous examples, paper is coated with several different compositions each composed of 100 parts of polypropylene as specified in Example 1, 5 parts of hydrogenated copolymer as specified in Example 1 and 5 parts of a low density polyethylene. The various polyethylenes used are described in Table III along with the results obtained.

The data show the desirability of using a polyethylene having the properties previously defined.

EXAMPLE 19

Using the formulation of Example 1, extrusion coating runs are made on commercial paper coating apparatus. The coating equipment includes:
6" Beloit extruder
80" Egan Series 32 coating die
80" Beloit coater
The coating conditions are:
Extruder Barrel Temperatures:
150° C., 232° C.,
288° C., 304° C.,
304° C.
Adapter Temperature: 304° C.
Die Temperatures: 304° C. on all zones
Melt Temperature: 288° C.
Air Gap: 5"
A 40#/ream unblended paper with no adhesion promoter added is first coated at the following speeds:

| Screw Speed (rpm) | Line Speed (fpm) | Coating Wt. (lbs./ream) | Coating Thickness (mils) | Adhesion |
|---|---|---|---|---|
| 100 | 550 | 11 | 0.77 | Good |
| 135 | 550 | 15 | 1.05 | Good |
| 170 | 680 | 15.6 | 1.09 | Good |
| 175 | 700 | 15.6 | 1.09 | Good |
| 175 | 760 | 14.4 | 1.01 | Good |
| 175 | 1000 | 11 | 0.77 | Good |
| 75 | 550 | 8.5 | 0.59 | Good |
| 50 | 550 | 5.7 | 0.40 | Marginal |

Then a 17#/ream paper, also with no adhesion promoter, is coated for use as an oil can liner at the same temperature profiles and the following speeds are achieved easily:

| Screw Speed (rpm) | Line Speed (fpm) | Coating Wt. (lbs./ream) | Coating Thickness (mils) | Adhesion |
|---|---|---|---|---|
| 160 | 1010 | 10.5 | 0.73 | Good |
| 130 | 1010 | 8.5 | 0.59 | Good |
| 145 | 1010 | 9.5 | 0.66 | Good |
| 160 | 1110 | 9.5 | 0.66 | Marginal |

In both cases good adhesion is achieved without priming the substrate and the coatings are free from pinholes.

TABLE I

| | Control Nos. | | | | Example Nos. | | |
|---|---|---|---|---|---|---|---|
| | A | B | C | D | 1 | 2 | 3 |
| Polypropylene, parts by weight | 100 | 100 | 100 | 100 | 100 | 100 | 100 |
| Polyethylene, parts by weight | | 10 | | 5 | 5 | 5 | 5 |
| Hydrogenated hydrocarbon polymer, parts by weight | | | 10 | | 5 | 4 | 3 |
| Unhydrogenated hydrocarbon polymer, parts by weight | | | | 5 | | | |
| Maximum coating speed, feet per minute | 300 | 450 | 300 | 350 | 600+ | 550 | 500 |
| Adhesion | Fair | Poor | Good | Good | Good | Good | Good |

TABLE II

| | Example Nos. | | | | | | |
|---|---|---|---|---|---|---|---|
| | E | F | 4 | 5 | 6 | 7 | 8 | 9 |
| Polypropylene, parts by weight | 100 | 100 | 100 | 100 | 100 | 100 | 100 | 100 |
| Polyethylene, parts by weight | 5 | 5* | 5 | 7.5 | 7.5 | 10 | 7.5 | 10 |
| Hydrogenated hydrocarbon polymer, | | | | | | | | |

TABLE II-continued

| | Example Nos. | | | | | | | |
|---|---|---|---|---|---|---|---|---|
| | E | F | 4 | 5 | 6 | 7 | 8 | 9 |
| parts by weight | | 5 | 5 | 7.5 | 5 | 5 | 3 | 3 |
| Unhydrogenated hydrocarbon polymer, parts by weight | 5 | | | | | | | |
| Maximum coating speed, fpm | 300 | 250 | 800 | 800 | 850 | 800 | 850 | 700 |
| Adhesion | | | Good | Good | Good | Good | Good | Good |

\* = high density polyethylene

TABLE III

| Control and Example Nos. | Polyethylene Properties | | | Maximum Coating Speeds, fpm | |
|---|---|---|---|---|---|
| | Density | Melt Index | $G_c$ ($\times 10^5$) | Procedure of Example 1 | Procedure of Example 4 |
| G | 0.923 | 4.5 | 3.1 | | 450 |
| H | 0.948 | 11.0 | — | 250 | 250 |
| I | 0.923 | 4.5 | 2.0 | 300 | |
| J | 0.922 | 8.0 | 2.1 | 250 | |
| K | 0.919 | 3.0 | 1.3 | 250 | |
| L | 0.961 | 7.7 | — | 250 | |
| M | 0.956 | 0.15 | — | 250 | |
| N | 0.924 | 3.5 | 2.7 | | 350, 450 |
| O | 0.923 | 4.0 | 2.7 | | 300 |
| 10 | 0.917 | 6.5 | 2.7 | 600* | 700, 800**, 750 |
| 11 | 0.915 | 15.0 | 3.6 | | 550 |
| 12 | 0.916 | 5.0 | 2.3 | | 650, 550 |
| 13 | 0.915 | 8.0 | 2.3 | 500 | 550, 500 |
| 14 | 0.915 | 12.0 | 2.2 | 500 | 600, 450 |
| 15 | 0.917 | 7.0 | 2.7 | | 650, 900 |
| 16 | 0.917 | 12.0 | 3.4 | | 700, 600 |
| 17 | 0.916 | 5.5 | 2.7 | | 650 |
| 18 | 0.915 | 13.5 | 3.4 | | 450 |

\* = data of Example 1
\*\* = data of Example 4

What I claim and desire to protect by Letters Patent is:

1. A propylene polymer composition having improved extrudability, comprising (a) a crystalline polypropylene having a melt flow rate at 230° C. of at least 3, (b) low density polyethylene having a density of 0.915 to 0.920, a melt index of 3 to 15 and a $G_c$ value of at least $2.5 \times 10^5$, and (c) a copolymer of vinyl toluene and alpha-methyl styrene, which has been hydrogenated to the point where at least 50% of its aromatic unsaturation has been reduced, and which has a drop softening point from about 100° to 160° C., component (b) being from 3 to 15 parts by weight per 100 parts of (a), component (c) being from 2 to 10 parts by weight per hundred parts of (a), and the total of (b) and (c) being 7 to 20 parts per hundred parts of (a).

2. A composition according to claim 1, characterized in that component (c) as an average molecular weight above about 600 (Rast Method), a softening point above 130° C., and an iodine value less than about 2.

* * * * *

UNITED STATES PATENT AND TRADEMARK OFFICE
CERTIFICATE OF CORRECTION

PATENT NO. : 4,365,044

DATED : DECEMBER 21, 1982

INVENTOR(S) : CHIA-SENG LIU

It is certified that error appears in the above-identified patent and that said Letters Patent are hereby corrected as shown below:

On the title page:

In Column under "Related U.S. Appln. Data" change

"May 12, 1981" to --May 15, 1981-- .

Column 1 at line 6 change "May 12, 1981" to --May 15, 1981--.

Claim 2 at line 41 change "as" to --has-- .

Signed and Sealed this

Fifteenth Day of March 1983

[SEAL]

Attest:

GERALD J. MOSSINGHOFF

Attesting Officer     Commissioner of Patents and Trademarks